(12) United States Patent
Wallner et al.

(10) Patent No.: US 8,581,458 B2
(45) Date of Patent: Nov. 12, 2013

(54) ELECTRICAL ACTUATING DRIVE

(75) Inventors: Herbert Wallner, Schoenaich (DE); Alexander Ernst, Steinenbronn (DE); Jens Haug, Dettenhausen (DE); Sabine Freyhardt, Rohrdorf (DE); Stefan Woessner, Stuttgart (DE)

(73) Assignee: Dr. Fritz Faulhaber GmbH & Co. KG, Schoenaich (DE)

( * ) Notice: Subject to any disclaimer, the term of this patent is extended or adjusted under 35 U.S.C. 154(b) by 317 days.

(21) Appl. No.: 12/799,116

(22) Filed: Apr. 19, 2010

(65) Prior Publication Data

US 2010/0277042 A1 Nov. 4, 2010

(30) Foreign Application Priority Data

Apr. 30, 2009 (DE) .................... 20 2009 006 227 U

(51) Int. Cl.
*H02K 7/06* (2006.01)
*H02K 7/10* (2006.01)
*H02K 11/00* (2006.01)
*H02K 29/08* (2006.01)
*H02K 5/04* (2006.01)

(52) U.S. Cl.
CPC . *H02K 29/08* (2013.01); *H02K 5/04* (2013.01)
USPC .............. 310/68 B; 310/83; 310/99

(58) Field of Classification Search
CPC ................................. H02K 29/08; H02K 5/04
USPC ............................................ 310/68 B, 99, 83
IPC .................................................. H02K 7/06, 7/10
See application file for complete search history.

(56) References Cited

U.S. PATENT DOCUMENTS

| 2,950,635 | A | * | 8/1960 | Bieger et al. ................... 475/338 |
| 3,153,158 | A | * | 10/1964 | Schmitter et al. ................ 310/83 |
| 3,659,128 | A | * | 4/1972 | Danek ............................. 310/99 |
| 5,457,371 | A |   | 10/1995 | Gordon |
| 5,930,905 | A |   | 8/1999 | Zabler et al. |
| 6,448,724 | B1 | * | 9/2002 | Kleinau et al. ........... 318/400.25 |
| 6,507,188 | B1 | * | 1/2003 | Dilger et al. ............. 324/207.25 |
| 6,633,099 | B2 | * | 10/2003 | Fulton et al. ................ 310/75 R |
| 6,791,219 | B1 | * | 9/2004 | Eric et al. ..................... 310/68 B |
| 6,861,837 | B1 | * | 3/2005 | Shimizu et al. .......... 324/207.25 |
| 7,017,274 | B2 |   | 3/2006 | Stobbe |
| 7,307,415 | B2 | * | 12/2007 | Seger et al. ................. 324/207.2 |
| 7,358,719 | B2 |   | 4/2008 | Kondo |
| 7,369,031 | B2 | * | 5/2008 | Narayanasamy ........... 338/32 H |
| 8,138,748 | B2 | * | 3/2012 | Malich et al. ............. 324/207.13 |
| 2002/0190709 | A1 | * | 12/2002 | Frederick et al. .......... 324/207.2 |

(Continued)

FOREIGN PATENT DOCUMENTS

| DE | 195 06 938 | 8/1996 |
| DE | 196 26 654 | 1/1998 |
| DE | 198 55 960 | 6/2000 |
| DE | 102 38 640 | 3/2004 |

(Continued)

*Primary Examiner* — John K Kim
(74) *Attorney, Agent, or Firm* — Collard & Roe, P.C.

(57) ABSTRACT

The present invention relates to an electrical actuating drive (1) for devices to be adjusted mechanically, having an electrical drive motor (2) and an output-drive shaft (4) which can be adjusted over a rotation actuating range of more than 360°, comprising an integrated contactless sensor angle measurement system (6) for determining and feeding back the respective rotation position of the output-drive shaft (4). The sensor angle measurement system (6) produces an output signal which largely simulates the characteristics of a conventional multiple potentiometer system.

20 Claims, 7 Drawing Sheets

(56) References Cited

U.S. PATENT DOCUMENTS

Figure 1:
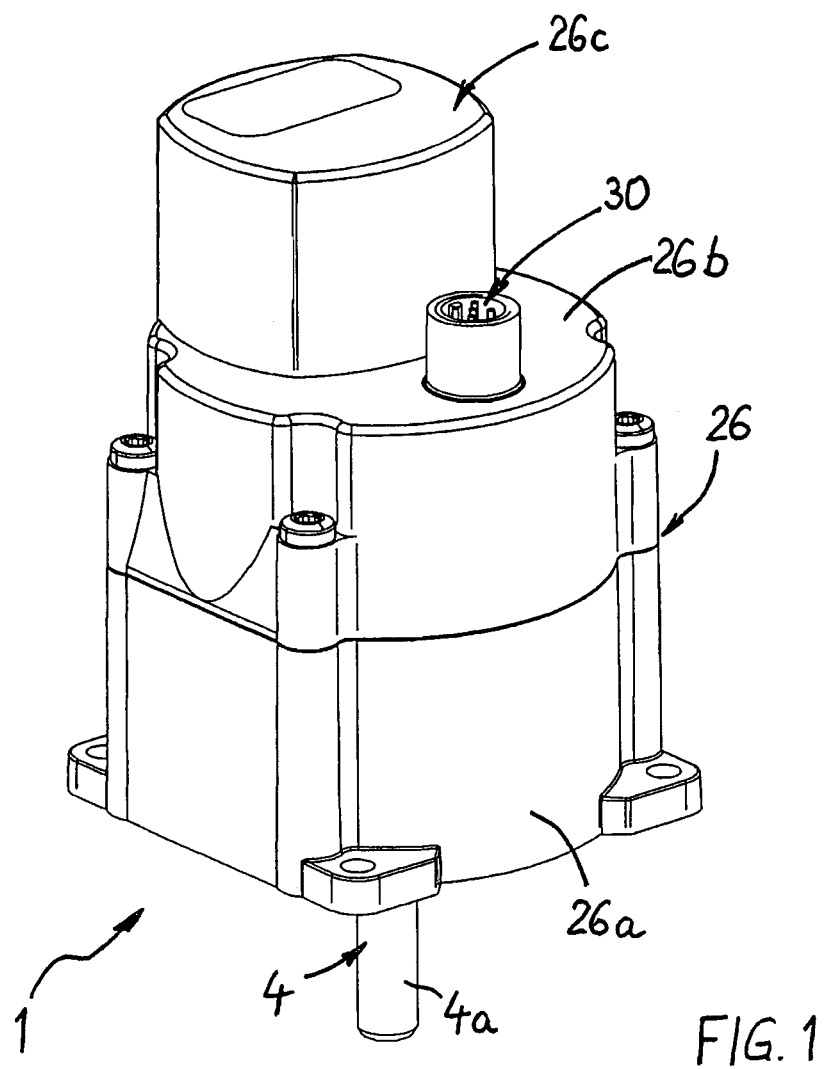

| | | |
|---|---|---|
| 2003/0038550 A1* | 2/2003 | Pan et al. .................. 310/68 B |
| 2003/0218458 A1* | 11/2003 | Seger et al. ................. 324/303 |
| 2004/0032173 A1* | 2/2004 | Tsergas ...................... 310/75 R |
| 2009/0031569 A1 | 2/2009 | Schirp et al. |
| 2009/0146646 A1* | 6/2009 | Malich et al. ............ 324/207.13 |
| 2009/0234540 A1 | 9/2009 | Collet et al. |
| 2010/0277042 A1* | 11/2010 | Wallner et al. ............. 310/68 B |

FOREIGN PATENT DOCUMENTS

| | | |
|---|---|---|
| DE | 10 2004 028 855 | 1/2005 |
| DE | 10 2005 058 131 | 6/2007 |
| DE | 10 2006 023 286 | 11/2007 |
| EP | 0 932 025 | 7/1999 |
| EP | 1 275 938 | 1/2003 |
| FR | 2 886 448 | 12/2006 |
| WO | WO 2006/023732 | 3/2006 |
| WO | WO 2007/121816 | 11/2007 |

* cited by examiner

ELECTRICAL ACTUATING DRIVE

CROSS REFERENCE TO RELATED APPLICATIONS

Applicants claim priority under 35 U.S.C. §119 of German Application No. 20 2009 006 227.9 filed Apr. 30, 2009.

The present invention relates to an electrical actuating drive for any desired devices which can be adjusted mechanically, having an electrical drive motor and an output-drive shaft which can be adjusted over a rotation actuating range of more than 360°.

Actuating drives such as these can be used for any desired drive functions, for example for machine parts, such as robot arms, flaps (for example also in aircraft) and the like. In this case, the aim is for the respective part to be moved any desired, clearly defined and detectable positions. An open-loop control system therefore requires a clear feedback signal in order to detect the respective position.

The present invention is based on the object of providing an actuating drive of said type which can be designed and used universally for specific applications, with a compact form.

According to the invention, this is achieved by the features of claim 1. Advantageous refinements and specific invention alternatives are contained in the further claims.

According to a first invention aspect, the actuating drive has an integrated contactless sensor angle measurement system for determining and feeding back the respective rotation position of the output-drive shaft, wherein the integrated angle measurement system preferably produces an output signal which largely simulates (emulates) the characteristics of a conventional multiple potentiometer system. This means that the output signal also simulates the errors which are normally present in a conventional multiple potentiometer system. A user of the actuating drive according to the invention can therefore continue to use his previous open-loop control system unchanged, provided at the user end, since the existing open-loop control system has measures to compensate for the errors of the potentiometer signal. According to the invention, in practice, errors or characteristics are therefore also simulated synthetically in the output signal of the angle measurement system in order that the actuating device can still be used in the existing open-loop control system without having to modify it.

By way of example, special characteristics of the emulated output signal are:
- simulation of a characteristic of a loaded voltage divider, that is to say "synthetic" distortion of the actually linear characteristic.
- simulation of a slipping clutch, that is to say the output signal is kept constant after the working range has been overshot or left, instead of jumping back to zero or to some other initial value.
- simulation of a ratiometric output, that is to say of a signal which is proportional to the applied voltage.

Furthermore, the actuating drive according to the invention can be made very compact by arranging the sensor angle measurement system in an integrated form together with the drive motor, the output-drive shaft and, preferably, a working transmission in a common housing.

Further details, special refinement features and embodiment variants will also become evident from the following description.

Figure 2:
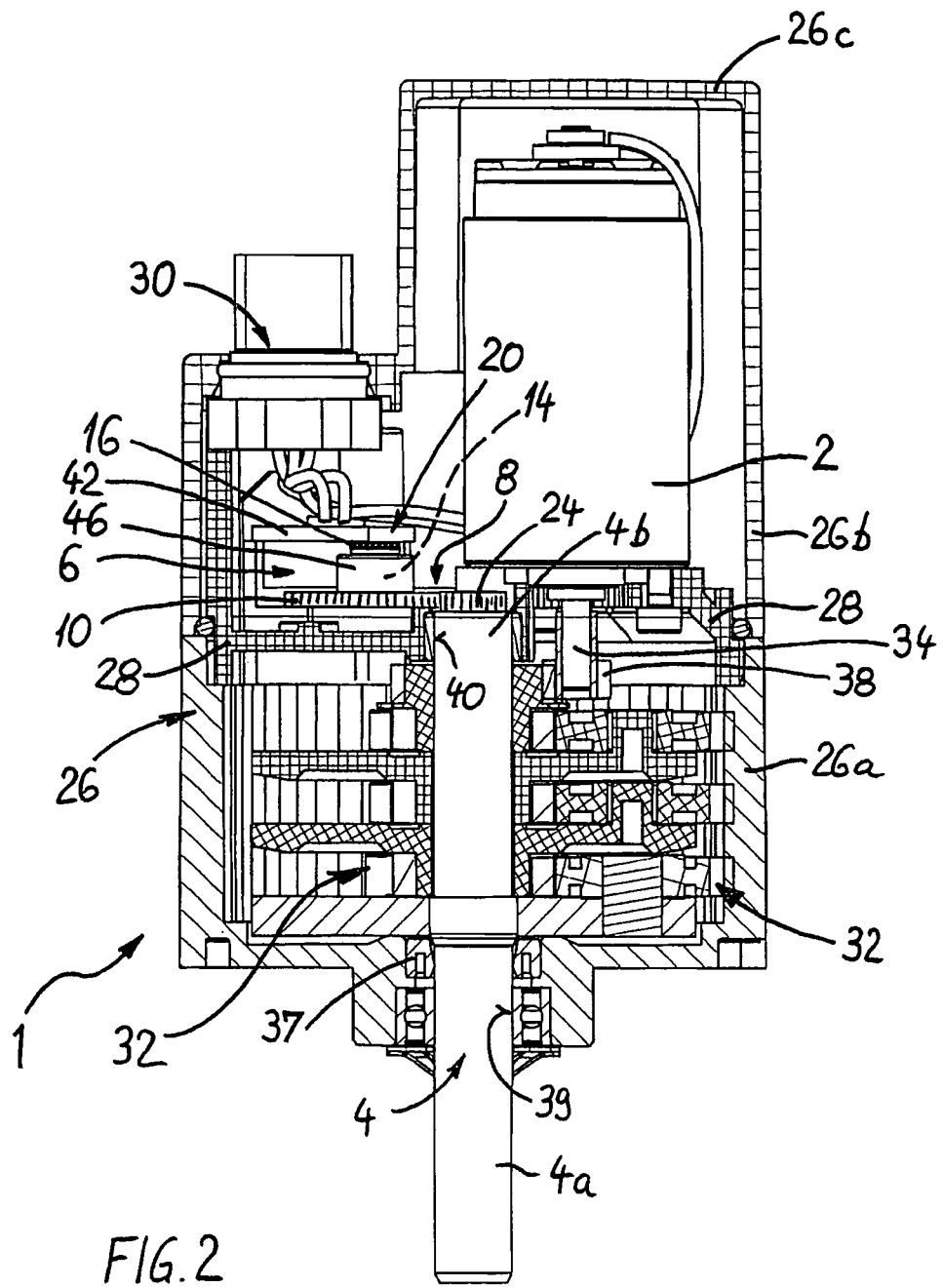
Figure 3:
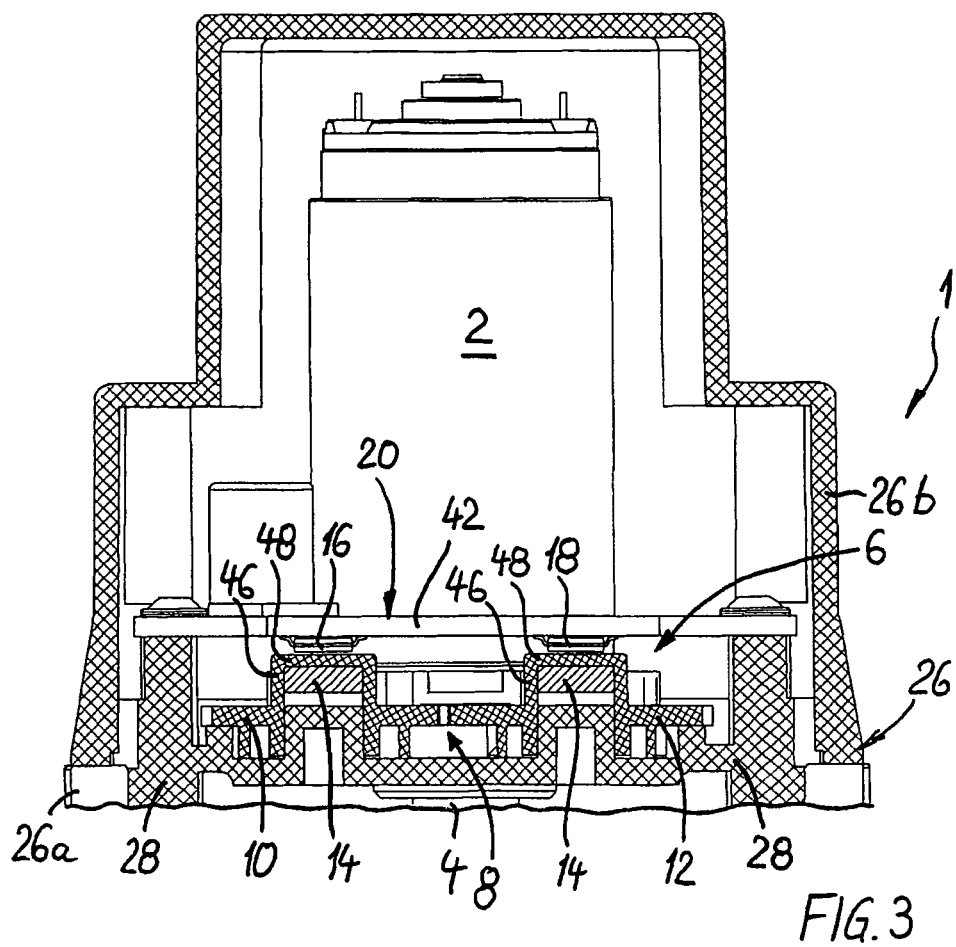
Figure 4:
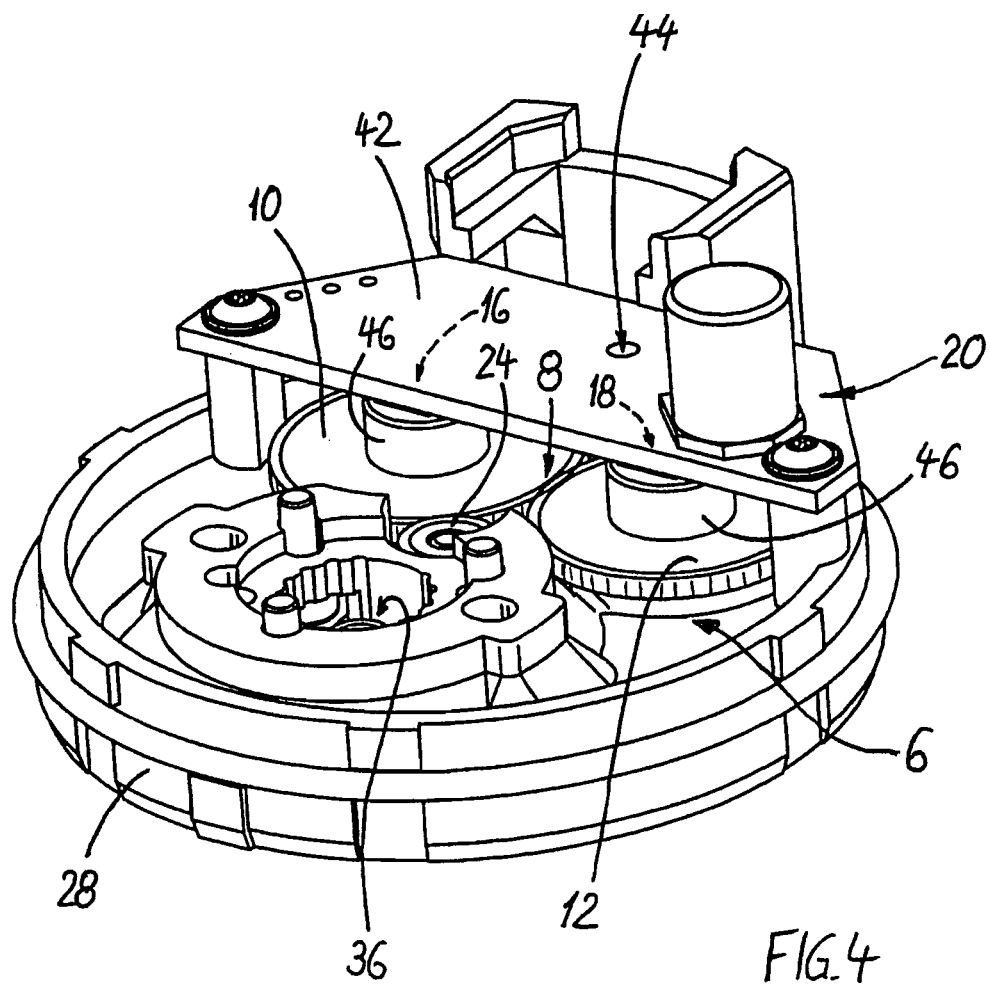
Figure 5:
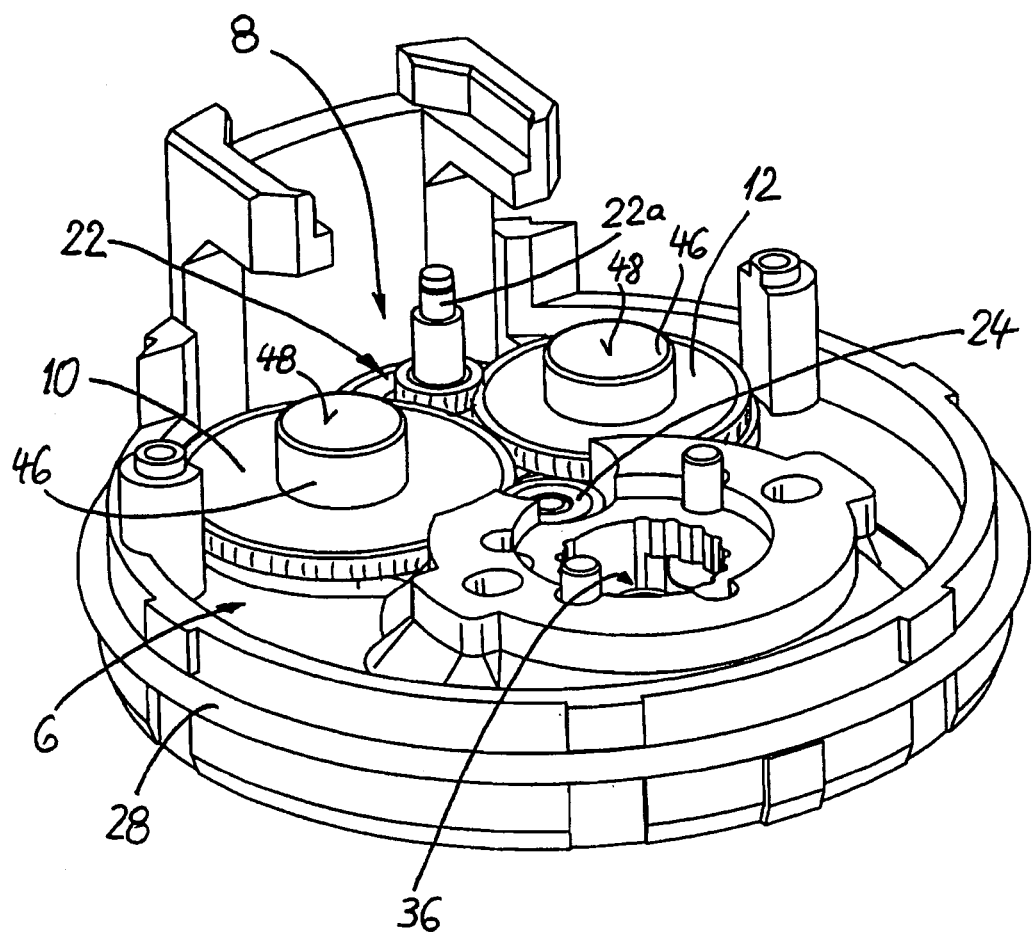
Figure 6:
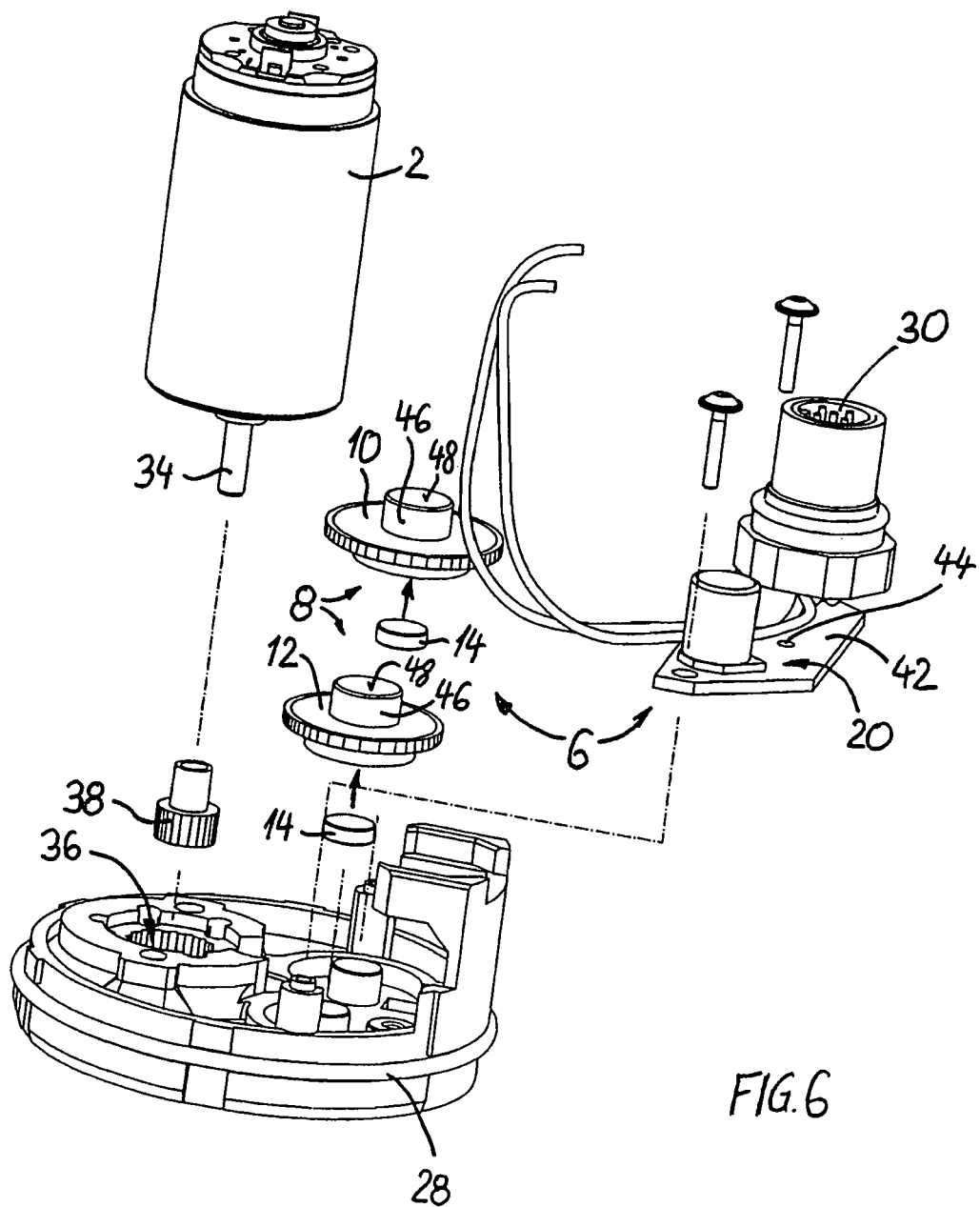
Figure 7:
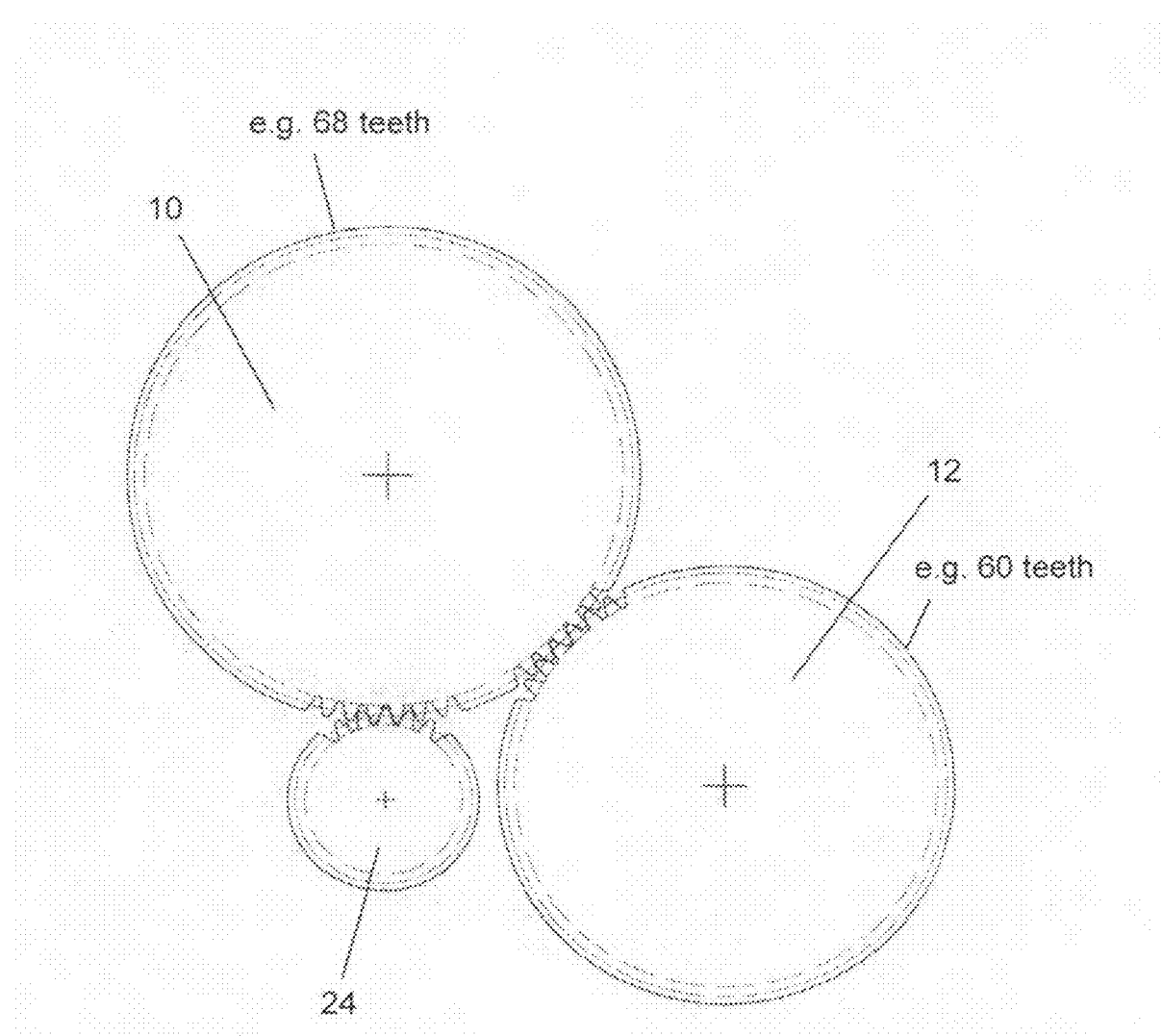

The invention will be explained in more detail in the following text with reference to preferred exemplary embodiments and embodiment variants which are illustrated in the drawing, in which:

FIG. 1 shows a perspective view of an actuating drive according to the invention with a closed housing, FIG. 2 shows an axial section through the actuating drive, FIG. 3 shows an enlarged axial section, on a section plane offset with respect to that shown in FIG. 2, and only in an (upper) subarea of the actuating drive, with a first embodiment of the angle measurement system, FIG. 4 shows a perspective view of the major elements of the angle measurement system in the embodiment shown in FIG. 3, FIG. 5 shows a perspective view similar to FIG. 4, in a second embodiment of the angle measurement system, FIG. 6 shows a perspective exploded view of the angle measurement system, with its major components, and FIG. 7 shows a top view of transmitter wheels and a pinion.

Identical parts are always provided with the same reference symbols in the various figures of the drawing.

An actuating drive 1 according to the invention has an electric drive motor 2 and an output-drive shaft 4, which can be adjusted over a rotation actuating range of more than 360°. In order to determine and feed back the respective rotation position of the output-drive shaft 4, the actuating drive 1, according to the invention, has an integrated contactless sensor angle measurement system 6.

According to one special invention aspect, the angle measurement system 6 is designed such that it produces an output signal which largely simulates (emulates) the characteristics of a conventional multiple potentiometer system.

In one preferred refinement, the angle measurement system 6 is in the form of an encoder system having an encoder transmission 8 which is driven by the output-drive shaft 4. For this purpose, the output-drive shaft 4 is coupled to at least two rotatably mounted transmitter wheels 10, 12 whose rotation positions are each detected individually and uniquely as absolute values by sensors, wherein the transmitter wheels 10, 12 are coupled with a specific step-up ratio such that the rotation position of the output-drive shaft 4 can be clearly determined over its entire actuating range of more than 360° on the basis of the detected rotation positions of the transmitter wheels 10, 12.

For this purpose, each transmitter wheel 10, 12 has a magnet element 14, and each transmitter wheel 10, 12 and its associated magnet element 14 is associated with a sensor 16, 18 with an associated evaluation device 20 for detecting the rotation position of the respective transmitter wheel 10, 12 on the basis of its magnet element 14. The preferred electronic evaluation device 20, which in particular has a microcontroller (μ-controller), then also determines the rotation position of the output-drive shaft 4 on the basis of the respectively detected combination of the rotation positions of the individual transmitter wheels 10, 12. The magnet elements 14 are preferably magnetized diametrically with respect to the rotation axis of the respective transmitter wheel 10, 12, and Hall sensors are used as the sensors 16, 18.

The elements of the encoder transmission 8 are preferably arranged in a row one behind the other, with only one of the transmitter wheels, the transmitter wheel 10 in the illustrated example, being directly coupled to the output-drive shaft 4. The transmitter wheels 10, 12 can either be directly coupled to one another (FIGS. 3 and 4), or else can be coupled to one another indirectly via an intermediate drive 22 (FIG. 5). In the last-mentioned case in FIG. 5 with the intermediate drive 22, the encoder transmission 8, with the transmitter wheels 10, 12, is preferably constructed on two axially offset planes.

In a further preferred refinement, the encoder transmission 8 is in the form of a gearwheel transmission. This ensures a torque-transmitting connection without any slip between the transmission elements. The step-up ratio (or the step-down ratio) of the transmitter wheels 10, 12 is in this case determined by the number of teeth on the engaged elements of the encoder transmission 8. A resultant difference in the number of teeth between the transmitter wheels 10, 12 is preferably greater than or equal to two, wherein the number of teeth on the transmitter wheels 10, 12 resulting from the overall step-up ratio are preferably even and in any case not relatively prime, as shown in FIG. 7.

In the first embodiment, shown in FIGS. 3 and 4, in which the two transmitter wheels 10, 12 engage directly, the ratio of their numbers of teeth "first transmitter wheel 10: second transmitter wheel 12" is, for example, 68:60. Other suitable ratios which satisfy the abovementioned conditions are, of course, also possible.

In the second embodiment, shown in FIG. 5, with an intermediate drive 22, several ratios may be provided, by way of example:

| | |
|---|---|
| A pinion 24 connected to the output-drive shaft 4: | 20 teeth |
| The first transmitter wheel 10 coupled to the pinion 24: | 68 teeth |
| A first gearwheel, coupled to the first transmitter wheel 10, of the intermediate drive 22: | 20 teeth |
| A second gearwheel of the intermediate drive 22: | 36 teeth |
| The second transmitter wheel 12, coupled to the second gearwheel of the intermediate drive 22: | 34 teeth |

It should be noted that these quoted ratios should be understood as being purely exemplary, and that, of course, any other configuration is also possible within the scope of the invention.

According to a further invention aspect, all the components of the actuating drive 1 are accommodated in a common, compact housing 26, which is preferably encapsulated in a sealed form. As shown in FIGS. 1 and 2, the housing 26 is at least approximately cylindrical, in the form of a pot. In this case, the housing 26 is split transversally approximately centrally into two cap-like housing parts 26a, 26b.

This means that a separating plane runs transversally, in particular at right angles to the axis of the output-drive shaft 4. A base part 28, which is essentially in the form of a plate, (in this context, also see in particular FIGS. 3 to 6) is arranged within the housing 26, approximately in the connection area of the two housing parts 26a, 26b. The second, "upper" housing part 26b may have a shroud-like extension 26c for holding an area of the drive motor 2. In addition, a bushing 30 for electrical connecting lines, which are not illustrated, is provided in the area of the second housing part 26b. The bushing 30 can preferably be in the form of a plug coupling for detachable plug connection of the connecting lines.

In a further preferred refinement, the drive motor 2 drives the output-drive shaft 4 indirectly via a working transmission 32. This working transmission 32 is arranged within the first housing part 26a, and is preferably in the form of a multistage epicyclic transmission; (see FIG. 2).

The encoder transmission 8 together with the transmitter wheels 10, 12, the sensors 16, 18 with the evaluation device 20 as well as the drive motor 2 are mounted on the base part 28, on its side facing away from the working transmission 32 into the second housing part 26b. A shaft 34 of the drive motor 2 passes through an opening 36 in the base part 28, and is coupled to the working transmission 32 via a drive pinion 38. Furthermore, the base part 28 also forms bearing points for all the rotating parts of the encoder transmission 8.

The output-drive shaft 4 has a connecting end 4a, which is passed out of the housing 26 to the exterior via a shaft seal 37 through a corresponding bearing opening 39 in the first housing part 26a, for connection to the respective device (not illustrated) to be adjusted, as well as an opposite extension 4b, which passes through a bearing opening 40 in the base part 28 and is coupled to the encoder transmission 8 via the pinion 24 (FIG. 2).

In a further advantageous refinement, the sensors 16, 18 are arranged together with the evaluation device 20 of the encoder system on a common printed circuit board 42. As can best be seen in FIG. 4, this printed circuit board 42 is attached to the base part 28 parallel to and at a distance from it such that it covers the transmitter wheels 10, 12 like a bridge, with each sensor 16, 18 being directly axially adjacent to the associated transmitter wheel 10, 12. In one particularly advantageous refinement, the printed circuit board 42 has a hole opening 44, whose surface is in particular metalized and which is in the form of a so-called "plated-through hole", which forms a rotating bearing point for a bearing journal 22a (FIG. 5) of the optional intermediate drive 22 of the encoder transmission 8 in the embodiment shown in FIG. 5. As shown in FIG. 5, the intermediate drive 22 is therefore mounted at one end in a bearing opening in the base part 28, and at the other end by means of the bearing journal 22a in the hole opening 44 in the printed circuit board 42 (cf. FIG. 4).

In order to accommodate the respective magnet element 14, each transmitter wheel 10, 12 has a pot-like outward bulge 46 for holding the magnet element 14 on its side which axially faces the printed circuit board 42, wherein this outward bulge 46 has a bottom wall 48 (FIG. 3) whose thickness defines a distance between the magnet element 14 and the associated sensor 16, 18. The transmitter wheels 10, 12, which are mounted only on one side on the base part 28 such that they can rotate, are therefore fixed on the other side by the sensors 16, 18 in the axial direction. This advantageously results in the actuating drive 1 according to the invention being independent of position, since the transmitter wheels 10, 12 rest on the sensors 16, 18 with little friction.

In a further advantageous refinement, in the preferred embodiment, the elements of the encoder transmission 8 are in the form of a gearwheel transmission with a tooth flank angle of less than 20°, contrary to the normal Standard. This measure serves to minimize the rotation flank play between the individual transmission elements.

The drive motor 2 and the encoder transmission 8 are mounted alongside one another on the base part 28 in approximately diametrically opposite areas. In this case, the rotation axes of the elements of the encoder transmission 8—in particular in the embodiment with an intermediate drive 22—approximately define a circular path which does not run concentrically with respect to the axis of the output-drive shaft 4. This contributes to the capability of the actuating drive 1 according to the invention to be of modular design, in particular with respect to the angle measurement system 6 and the encoder transmission 8. The respectively suitable components can thus be chosen from a plurality of available components for matching the different applications, and can be used as building blocks to assemble the actuating drive 1.

Special invention aspects relating to the measurement and evaluation electronics, and the output signal, will also be explained in the following text.

The output signal is ratiometric, corresponding to the potentiometer emulation. The ratiometric output of a potentiometer is correspondingly simulated for this purpose in the microcontroller of the evaluation device 20. For this purpose, the supply voltage is read in with a resolution, for example, of 12 to 13 bits, and the output value is correspondingly corrected.

The invention also provides for the output signal to simulate a loaded potentiometer characteristic. This can be achieved by means of a correction table in the microcontroller.

Furthermore, it is advantageously possible to simulate the behavior of a slipping clutch by keeping the output signal constant, that is to say not changing it any further, when specific position limits are overshot.

Furthermore, a high degree of temperature independence can be achieved in that the output signal is read back and is adapted via a closed-loop control system. The output signal is preferably read in with high resolution (12 to 13 bits). The value read back is compared with the value to be output, and the latter is corrected if necessary.

The resolution of an A/D converter which is used for reading in the output signal and the supply voltage can furthermore advantageously be increased by oversampling, in order to allow a low-cost A/D converter to be used.

A low current draw of the angle measurement system 6 can be achieved by deactivating the sensors 16, 18 and/or by current filtering at times. The comparatively low current draw—in comparison to optical encoders for example—is achieved mainly by switching the sensors, which operate on a Hall sensor basis, to a "low-power mode" between the reading of the angle information items. A filter (RC filter) smoothes the current, and therefore prevents current surges.

Furthermore, the output signal may advantageously comprise a filtered "PWM signal" and the output of a D/A converter. No external D/A converter is therefore required, since an analog output signal is formed from the, for example, 10-bit D/A converter and a, for example, 8-bit PWM of the microcontroller. In this case, a calibration process is carried out such that the two signals are formed without any discontinuities from, for example, 18 bits.

It should also be noted that the invention is not restricted to the combination of features in claim 1. In fact, all the individual features, as they are disclosed throughout the application, can be used individually and in any desired combinations. In addition, it is likewise within the scope of the invention for the described overall concept of the actuating drive to be equipped with a digital interface for transferring the encoder output signal, which is then directly in digital form. The A/D and D/A converters mentioned above are then not required.

The invention claimed is:

1. Electrical actuating drive for devices to be adjusted mechanically, having an electrical drive motor and an output-drive shaft which can be adjusted over a rotation actuating range of more than 360°, comprising an integrated sensor angle measurement system for contactlessly determining and feeding back the respective rotation position of the output-drive shaft and a compact housing which is split transversally approximately centrally into two cap-like housing parts, wherein the sensor angle measurement system is in the form of an encoder system having an encoder transmission which is driven by said output-drive shaft, wherein said output-drive shaft is coupled to at least two rotating transmitter wheels, whose rotation positions are each detected contactlessly, individually and uniquely as absolute values by a respective sensor, wherein the transmitter wheels are coupled with a specific step-up ratio or step-down ratio such that the rotation position of the output-drive shaft can be determined on the basis of the detected combination of the rotation positions of the transmitter wheels, wherefore an associated electronic evaluation device processes the detected rotation positions in such a way that the angle measurement system produces an output signal which simulates particular characteristics of a multiple potentiometer system, that is simulation of a ratiometric output and simulation of a loaded potentiometer characteristic, wherein only one of the transmitter wheels is directly coupled to the output-drive shaft, wherein the transmitter wheels are directly or indirectly coupled to one another via an intermediate drive, wherein a base part is arranged within the housing in the connection area of the housing parts, and wherein the working transmission is arranged within the first housing part, while the angle measurement system and the drive motor are accommodated within the second housing part.

2. Actuating drive according to claim 1, wherein each transmitter wheel has a magnet element associated with one of the respective sensors with the associated evaluation device, the associated evaluation device detecting the rotation position of the respective transmitter wheel on the basis of the magnet element, wherein the evaluation device also determines the rotation position of the output-drive shaft on the basis of the rotation positions of the transmitter wheels.

3. Actuating drive according to claim 1, wherein the encoder transmission is in the form of a gearwheel transmission, wherein the step-up ratio of the transmitter wheels is determined by the number of teeth on the elements of the encoder transmission.

4. Actuating drive according to claim 3, wherein the transmitter wheels have a resultant difference in the number of teeth of greater than or equal to two, wherein the number of teeth on the transmitter wheels resulting from the overall step-up ratio are not relatively prime.

5. Actuating drive according to claim 1, wherein the drive motor drives the output-drive shaft via a working transmission, wherein the working transmission is preferably in the form of a multistage epicyclic transmission.

6. Actuating drive according to claim 1, wherein the encoder transmission together with the transmitter wheels, the sensors and the evaluation device as well as the drive motor are mounted on the base part, on its side facing away from the working transmission, wherein a shaft of the drive motor passes through an opening in the base part, and is coupled to the working transmission via a drive pinion.

7. Actuating drive according to claim 1, wherein the output-drive shaft has a connecting end, which is passed out of the housing, for connection to the respective device to be adjusted, as well as an opposite extension, which passes through an opening in the base part and is coupled to the encoder transmission, in particular via a pinion.

8. Actuating drive according to claim 1, wherein the sensors and the evaluation device of the encoder system are arranged on a common printed circuit board, wherein the printed circuit board is attached to the base part parallel to and at a distance from it such that each sensor is directly axially adjacent to the associated transmitter wheel.

9. Actuating drive according to claim 8, wherein the printed circuit board has a hole opening, whose surface is in particular metalized, as a rotating bearing point for the intermediate drive of the encoder transmission.

10. Actuating drive according to claim 8, wherein each transmitter wheel has a pot-like outward bulge for holding a magnet element on its side which axially faces the printed circuit board, wherein the outward bulge has a bottom wall whose thickness defines a distance between the magnet element and the associated sensor.

11. Actuating drive according to claim 2, wherein the transmitter wheels are mounted on one side and are fixed on the other side by the sensors in the axial direction.

12. Actuating drive according to claim 1, wherein the elements of the encoder transmission comprise a gearwheel transmission with a tooth flank angle of less than 20°.

13. Actuating drive according to claim 1, wherein the drive motor and the encoder transmission are mounted alongside one another in approximately diametrically opposite areas, wherein the rotation axes of the elements of the encoder transmission approximately define a circular path which does not run concentrically with respect to the axis of the output-drive shaft.

14. Actuating drive according to claim 1, further comprising a module containing the angle measurement system.

15. Actuating drive according to claim 1, wherein the output signal does not change any further when selected position limits are overshot.

16. Actuating drive according to claim 1, wherein the output signal is read back and is adapted via a closed-loop control system.

17. Actuating drive according to claim 1, wherein oversampling is used for reading in the output signal and the supply voltage.

18. Actuating drive according to claim 1, wherein the output signal comprises a filtered PWM signal and the output of a D/A converter.

19. Actuating drive according to claim 1, wherein the current drawn by the angle measurement system is minimized by deactivating the sensors and/or by current filtering at times.

20. Actuating drive according to claim 1, further comprising a digital interface for transferring the output signal from the angle measurement system.

\* \* \* \* \*